(12) United States Patent
McQuiston (10) Patent No.: US 6,382,819 B1
(45) Date of Patent: May 7, 2002

(54) VEHICLE RUNNING BOARD

(75) Inventor: Timothy P. McQuiston, Hartford, WI (US)

(73) Assignee: California Dream, Inc., Hartland, WI (US)

( * ) Notice: Subject to any disclaimer, the term of this patent is extended or adjusted under 35 U.S.C. 154(b) by 0 days.

(21) Appl. No.: 09/669,540

(22) Filed: Sep. 26, 2000

(51) Int. Cl.$^7$ ................................................. B60Q 1/24
(52) U.S. Cl. .................... 362/495; 362/487; 362/540
(58) Field of Search ................................ 362/487, 495, 362/496, 506, 540–542, 459

(56) References Cited

U.S. PATENT DOCUMENTS

| | | |
|---|---|---|
| 1,321,157 A | 11/1919 | Snell |
| 1,547,591 A | 7/1925 | Lambert |
| 1,654,033 A | 12/1927 | Bishop |
| 1,732,994 A | 10/1929 | Spiro |
| 1,862,131 A | 6/1932 | Woolson |
| 3,684,311 A | 8/1972 | Pierce |
| D257,250 S | 10/1980 | Stoltenberg et al. ........ D12/203 |
| D260,253 S | 8/1981 | Waters, Jr. ................. D12/203 |
| 4,463,962 A | 8/1984 | Snyder ..................... 280/164.1 |
| 4,544,991 A | 10/1985 | Gorsuch ...................... 362/495 |
| 4,557,494 A | 12/1985 | Elwell ....................... 280/164.1 |
| D302,967 S | 8/1989 | Bowdoin .................... D12/203 |
| D330,536 S | 10/1992 | Holloway et al. ......... D12/203 |
| 5,193,829 A | 3/1993 | Holloway et al. .......... 280/163 |
| D336,629 S | 6/1993 | Hinrichs et al. ............ D12/203 |
| D349,678 S | 8/1994 | Waddington et al. ...... D12/203 |
| D349,679 S | 8/1994 | Waddington et al. ...... D12/203 |
| D351,128 S | 10/1994 | Waddington et al. ...... D12/203 |
| 5,382,035 A | 1/1995 | Waddington et al. ........ 280/169 |
| D361,973 S | 9/1995 | Hornik ....................... D12/203 |
| D395,267 S | 6/1998 | Thompson ................. D12/203 |
| D395,268 S | 6/1998 | Tucker ....................... D12/203 |
| D395,269 S | 6/1998 | McCauley, Jr. ............ D12/203 |
| D397,980 S | 9/1998 | Thompson ................. D12/203 |
| D399,178 S | 10/1998 | Thomas, Jr. ............... D12/203 |
| 5,823,553 A | 10/1998 | Thompson ................. 280/164.1 |
| D400,486 S | 11/1998 | Zentner ..................... D12/203 |
| 6,050,579 A | 4/2000 | Selland et al. .............. 280/163 |
| D434,711 S | 12/2000 | McQuiston ................. D12/203 |

*Primary Examiner*—Alan Cariaso
(74) *Attorney, Agent, or Firm*—Ryan Kromholz & Manion, S.C.

(57) ABSTRACT

A vehicle running board for attachment to a vehicle, comprising a first running board component, a second running board component, a lamp assembly, and a coupling between the running board components. Also disclosed is a method and structure to operate running boards to emit light to indicate at least one of vehicular dome light activation, vehicular braking, vehicular reverse gear engagement, vehicular turn signaling, vehicular emergency signaling, remote keyless entry activation, and vehicular headlight activation. A support member receiver is disposed along the bottom side of the running board components and is optionally coupled with a support member, providing additional structural stability to the running board. Traction grooves are disposed on the top side of the running board components, and the vehicle running board may be formed by blow molding or rotational molding techniques to evenly distribute acrylonitrile butadiene styrene (ABS).

19 Claims, 9 Drawing Sheets

VEHICLE RUNNING BOARD

BACKGROUND OF THE INVENTION

1. Field of the Invention

This invention relates to accessories attachable to a vehicle and, in particular, it relates to running boards.

2. Related Art

Manufacturers and vehicle users add running boards to vehicles for both aesthetic appeal and functionality. A person entering or exiting a vehicle may step onto the running board to more easily facilitate vehicle entry, particularly with respect to vehicles riding high off the ground, such as trucks. Running boards are known in the art, such as those disclosed in U.S. Pat. No. 5,823,553 to Thompson, incorporated herein by reference.

Traditionally, running boards are formed with one piece construction and typically are either vacuum formed or injection molded. Although these manufacturing techniques perform suitably for some applications, because of the materials commonly used to manufacture the running boards, most running boards require support members mounted on to the vehicle frame in order to adequately support the weight load when somebody steps on the running board. A loss of structural strength and stability may occur across the mid-point of the running board if the weight load is centered on the running board.

On traditional running boards with lights, such as that disclosed in U.S. Pat. No. 4,557,494 to Elwell, the lights are disposed on the under-side or outer-side of the running board to facilitate bulb changes. However, this exposure results in bulb breakage and build up of dirt, tar and other debris common to exposure to environmental conditions.

With ever-increasing vehicular travel, safety is of utmost importance. The more safety features a vehicle has, the more confident and safer the driver and passengers will feel. Lights that indicate vehicular dome light activation, vehicular braking, vehicular reverse gear engagement, vehicular turn signaling, vehicular emergency signaling, remote keyless entry activation, and vehicular headlight activation are safety features that have not seen widespread use in conjunction with running boards. Because running boards are easily viewed from the sides and at front and rear angles in relationship to the direction of vehicular travel, running boards present opportune vantage points to indicate others of the vehicle's travel status. The present invention is directed at solving these and other apparent shortcomings in the art.

SUMMARY OF THE INVENTION

A vehicle running board for attachment to a vehicle is disclosed, the vehicle running board comprising a first running board component, a second running board component, a lamp assembly, and a coupling that joins the first running board component with the second running board component to provide an extended length running board. The lamp assembly is coupled with at least one of the first and the second running board components.

The lamp assembly emits light to indicate at least one of vehicular dome light activation, vehicular braking, vehicular reverse gear engagement, vehicular turn signaling, vehicular emergency signaling, remote keyless entry activation, and vehicular headlight activation. The lamp assembly comprises a light bulb fully enclosed within an enclosure. The lamp assembly is detachably coupled to a power source, and the power source may be the vehicle electrical system or a battery independent of the vehicle electrical system.

The first and second running board components have a top side and a bottom side, and a support member receiver disposed along the bottom side of at least one of the first running board component and the second running board component. A support member may be coupled with the support member receiver to provide additional structural stability to the running board.

Traction grooves are disposed on the top side of at least one of the first running board component and the second running board component. The vehicle running board may be formed by any number of techniques, including blow molding and rotational molding techniques. The vehicle running board may be constructed of thermoplastic resin, including styrenic compounds in general and acrylonitrile butadiene styrene (ABS). The ABS may include a fiber additive, including glass fiber and/or mineral fiber.

A method of indicating at least one of vehicular dome light activation, vehicular braking, vehicular reverse gear engagement, vehicular turn signaling, vehicular emergency signaling, remote keyless entry activation, and vehicular headlight activation is also disclosed, the method comprising the steps of: coupling a vehicle running board on a vehicle, providing the vehicle running board with a lamp assembly in electronic communication with a lighting circuitry on the vehicle, the lighting circuitry operable to indicate at least one of vehicular dome light activation, vehicular braking, vehicular reverse gear engagement, vehicular turn signaling, vehicular emergency signaling, remote keyless entry activation, and vehicular headlight activation. The method further comprises the step of activating the lamp assembly in response to the lighting circuitry on the vehicle.

DETAILED DESCRIPTION

Although the disclosure hereof is detailed and exact to enable those skilled in the art to practice the invention, the physical embodiments and methods herein disclosed merely exemplify the invention which may be embodied in other specific structure or method. While the preferred embodiment has been described, the details may be changed without departing from the invention, which is defined by the claims.

Figure 1:
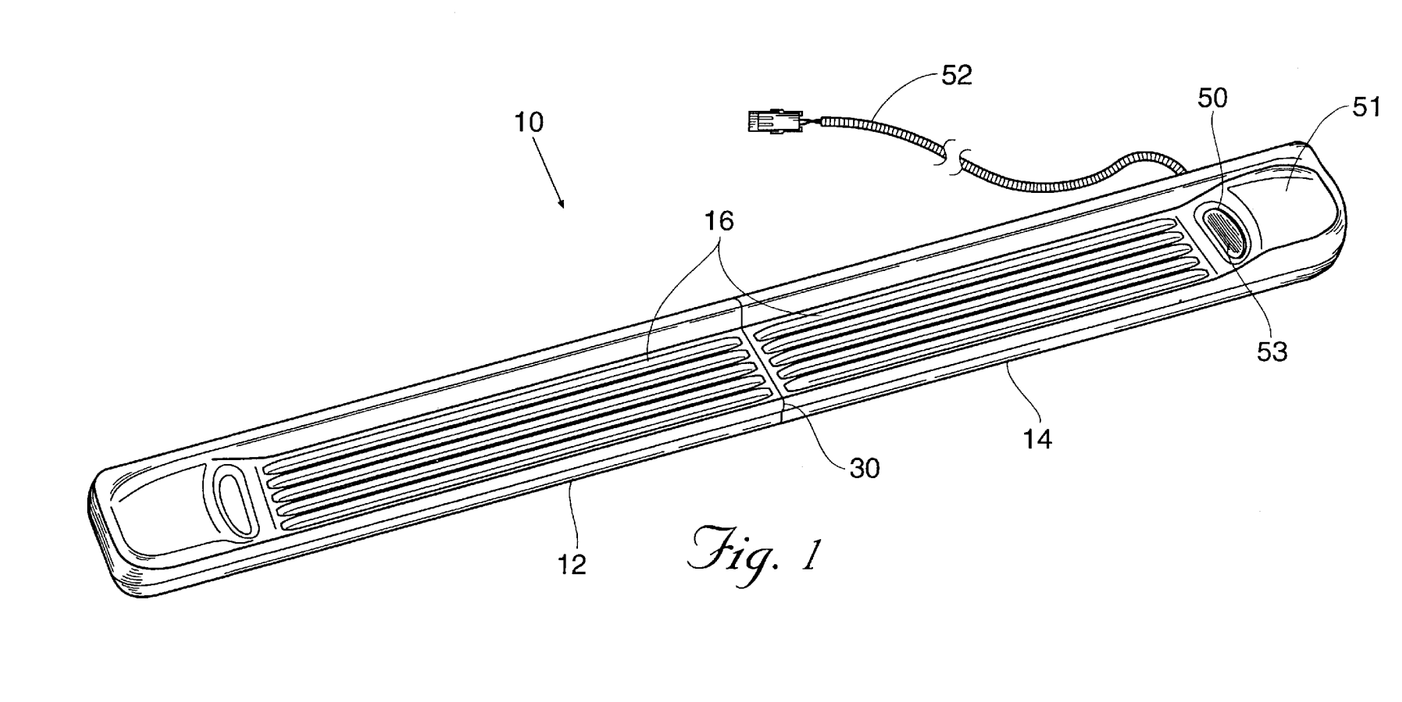
FIG. 1 is a top perspective view of a right side running board.
Figure 8:
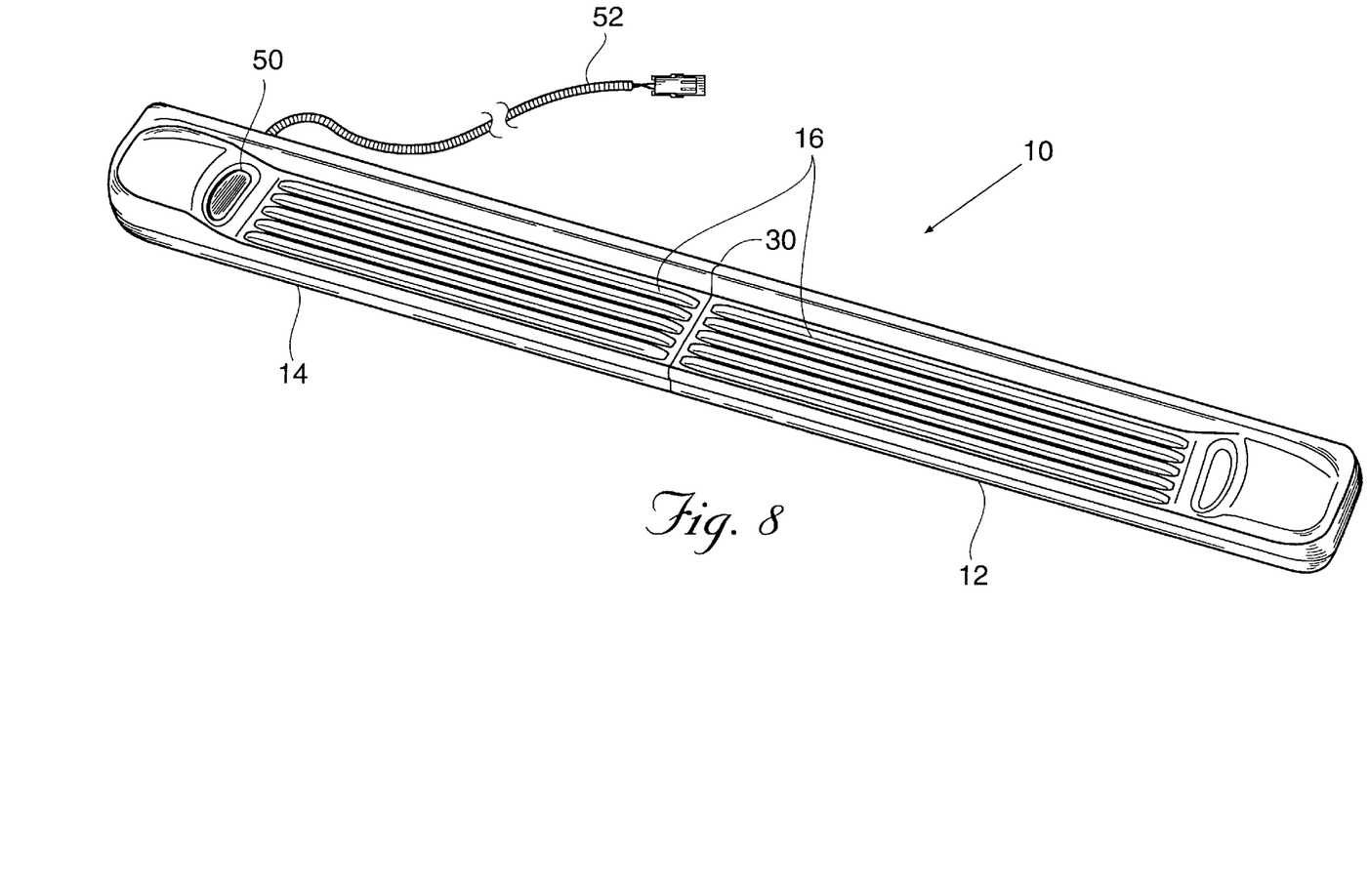
FIG. 8 is a perspective view of a left side running board.
Figure 9:
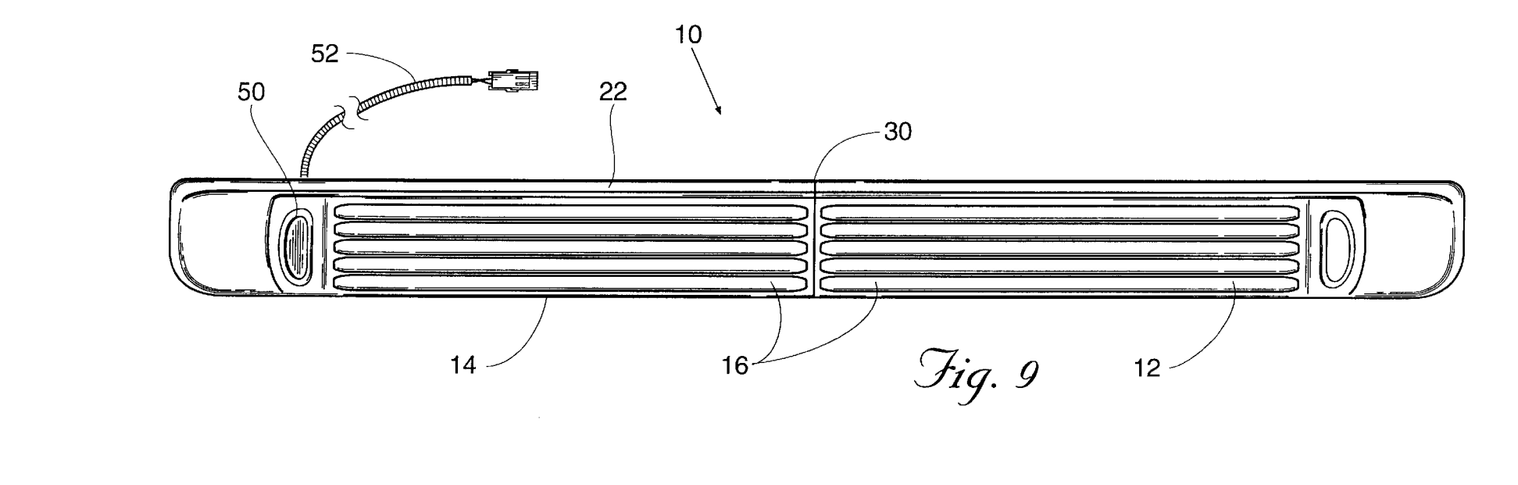
FIG. 9 is a top plan view of the left side running board.

Referring to FIG. 1, a vehicle running board 10 for attachment to a vehicle is disclosed. The vehicle running board 10 comprises a first running board component 12, a second running board component 14, a lamp assembly 50, and a coupling 30 that couples the first running board component 12 with the second running board component 14. The lamp assembly 50 is secured to at least one of the first and the second running board components 12 and 14. In a preferred embodiment, the lamp assembly 50 is disposed proximate to the front of the running board 10 relative to the direction of forward vehicular travel. This location advantageously allows vehicles traveling in the driver's "blind spot" to view the lamp assembly 50 when the lamp assembly 50 is activated in response to a number of routine vehicular mobilizations. When comparing the views of FIGS. 1 and 8, it will be observed that the right and left side running boards are mirror images of one another. Accordingly, like parts of the respective running boards are denoted by like reference characters.

Figure 2:
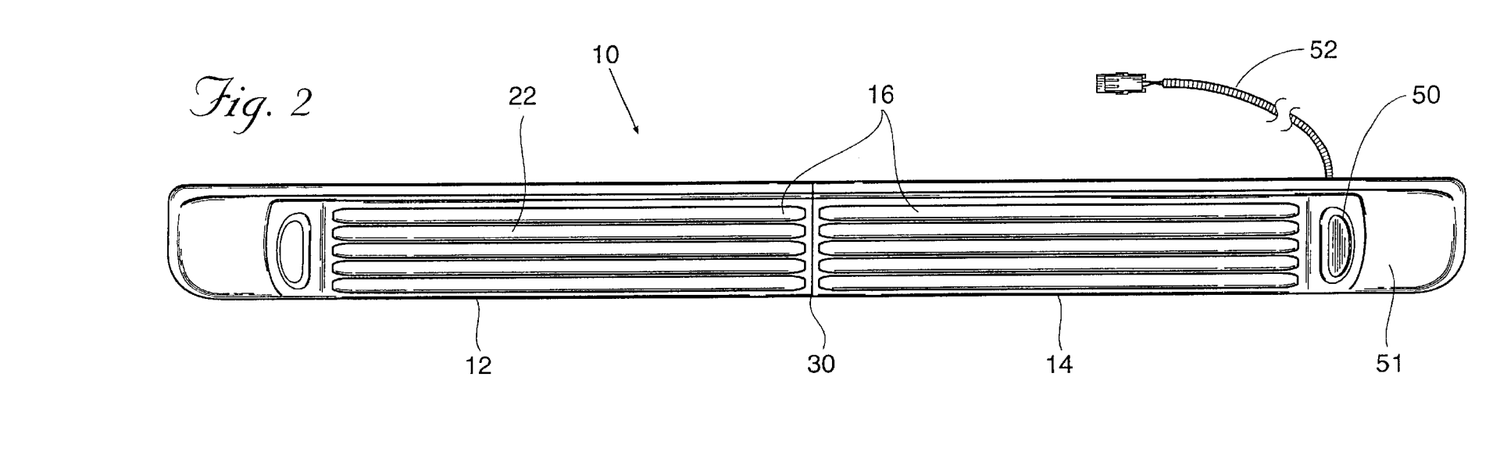
FIG. 2 is a top plan view of the right side running board.
Figure 3:
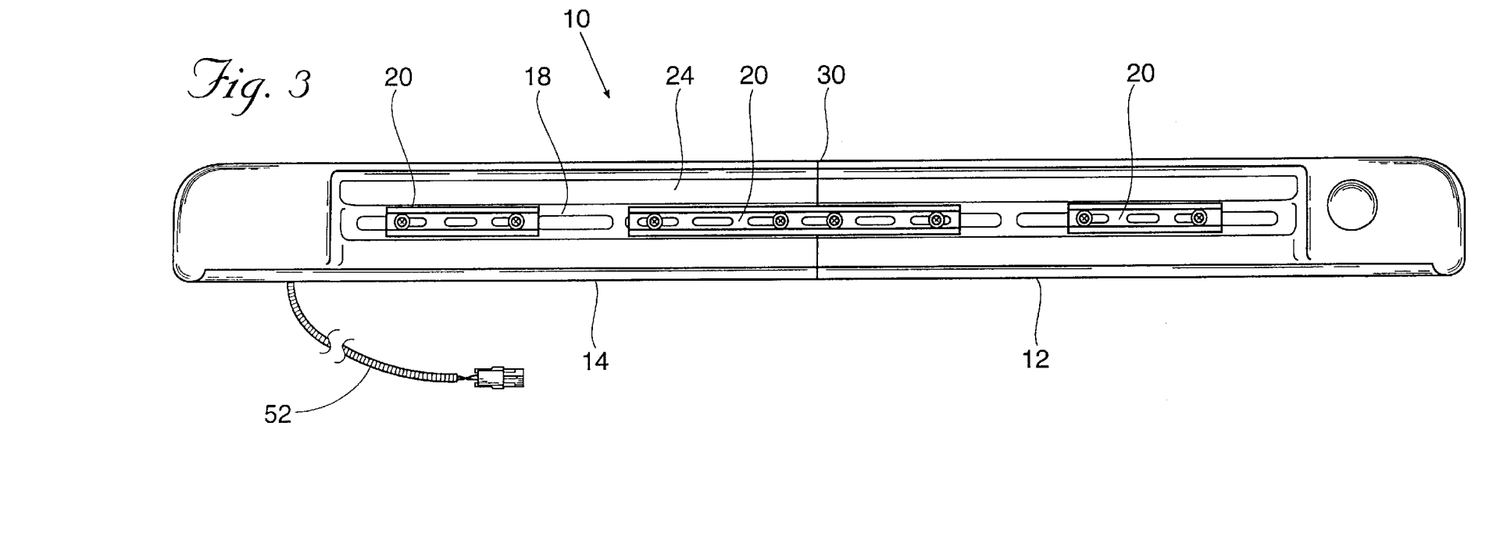
FIG. 3 is a bottom plan view of the right side running board.
Figure 4:
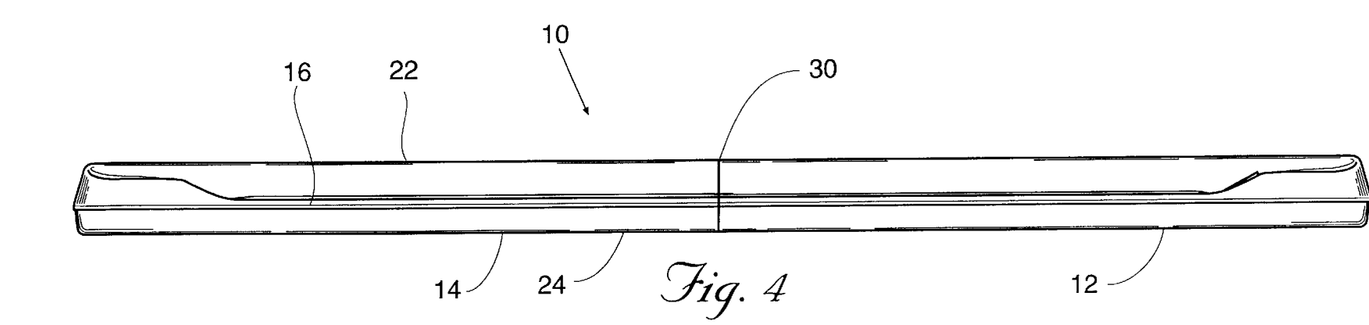
FIG. 4 is a right side elevational view of the right side running board.
Figure 5:
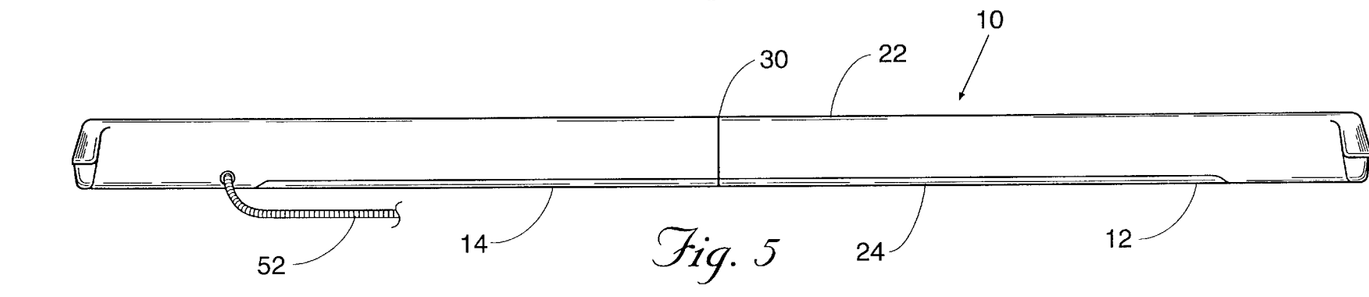
FIG. 5 is a left side elevational view of the right side running board.
Figure 6:
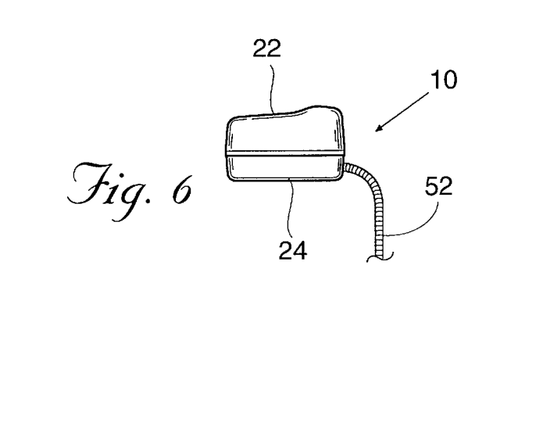
FIG. 6 is a rear elevational view of the right side running board.
Figure 7:
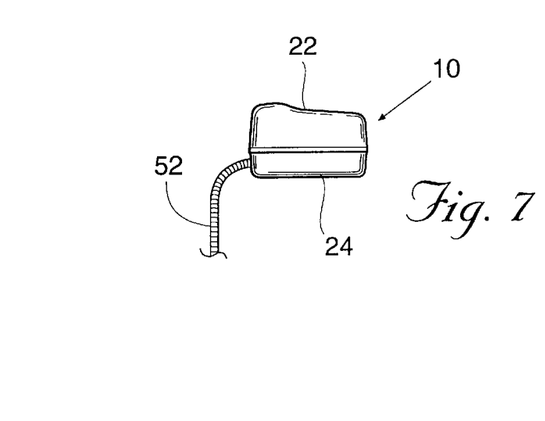
FIG. 7 is a front elevational view of the right side running board.

Referring to FIGS. 2 and 3, the first and second running board components 12 and 14 have a top side 22 and a bottom side 24, and a support member receiver 18 disposed along the bottom side 24 of at least one of the first running board component 12 and the second running board component 14. In order to facilitate sure footing in snowy, wet, or muddy conditions, traction grooves 16 are disposed on the top side 22 of at least one of the first running board component 12 and the second running board component 14.

Figure 10:
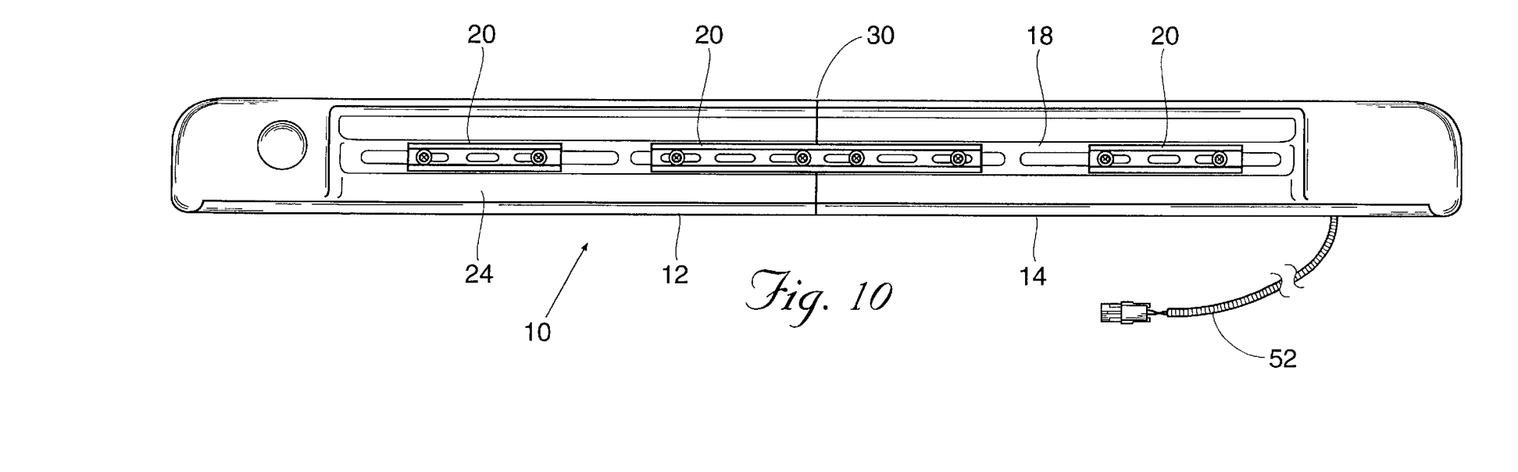
FIG. 10 is a bottom plan view of the left side running board.
Figure 11:
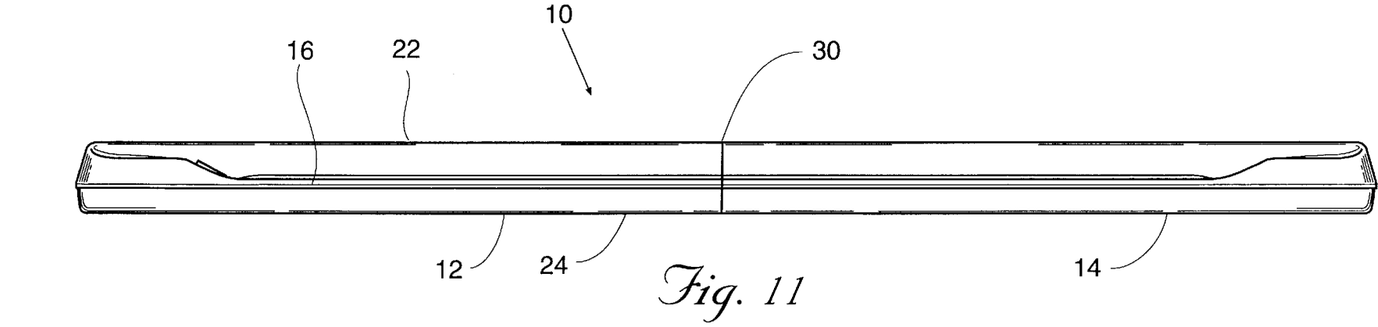
FIG. 11 is a left side elevational view of the left side running board.
Figure 12:
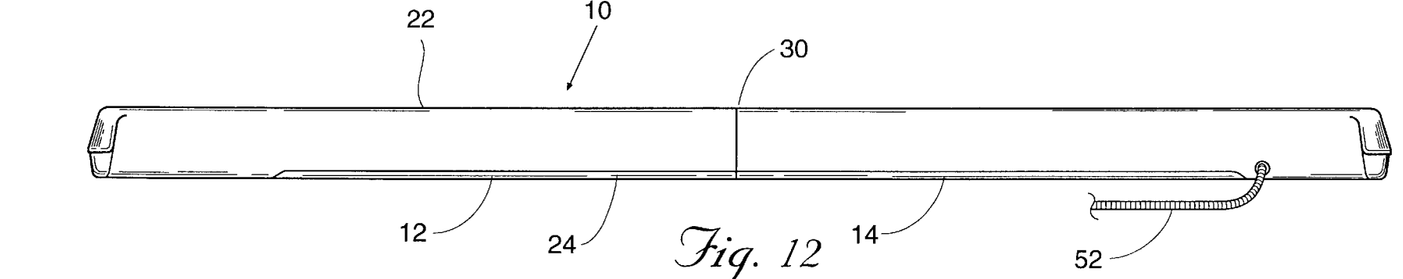
FIG. 12 is a right side elevational view of the left side running board.
Figure 13:
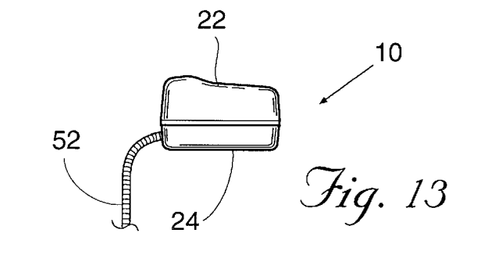
FIG. 13 is a rear elevational view of the left side running board.
Figure 14:
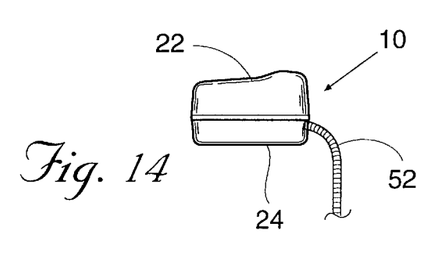
FIG. 14 is a front elevational view of the left side running board.
Figure 15:
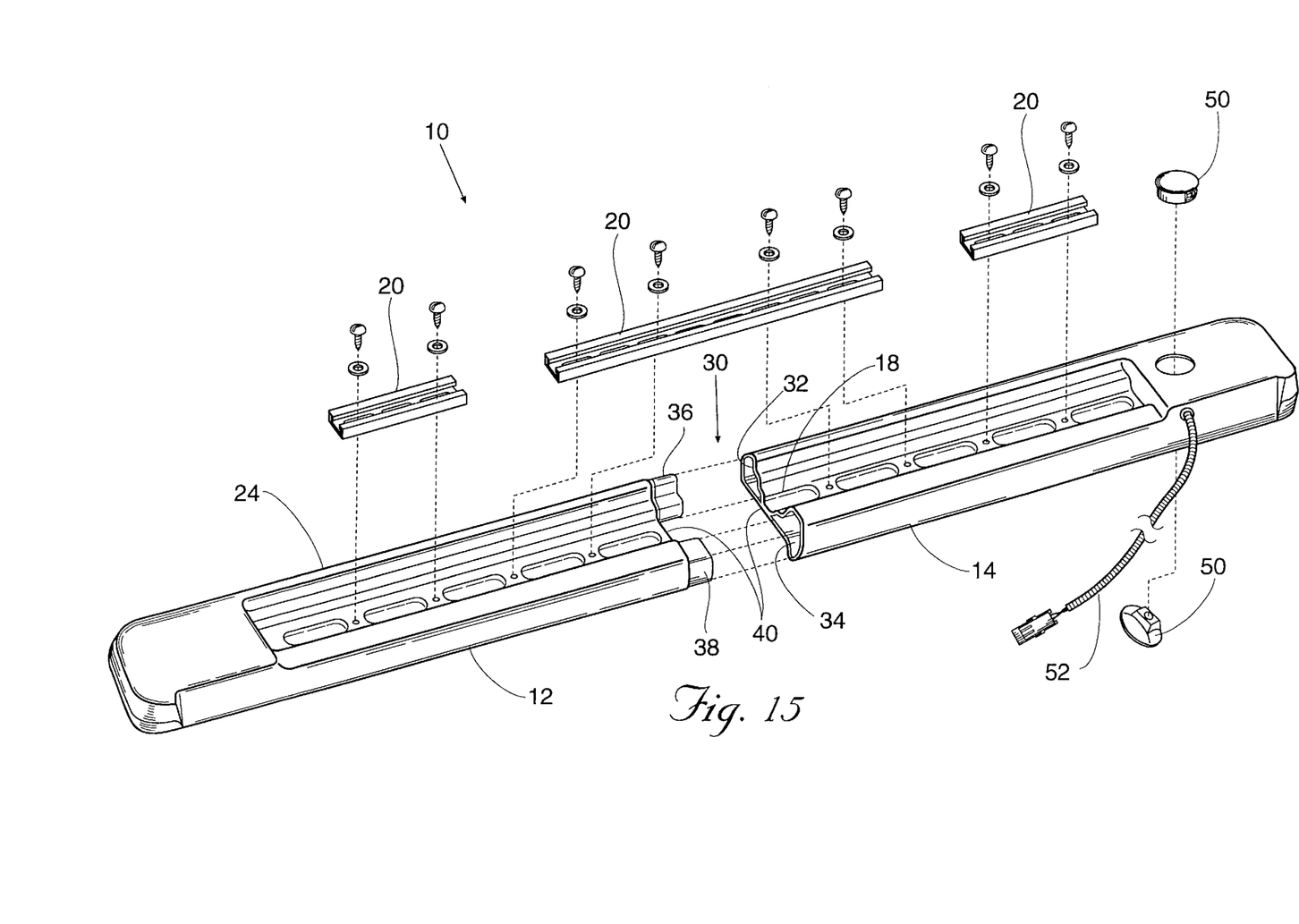
FIG. 15 is an alternative embodiment showing a bottom perspective view of a two-piece right side running board and detachable coupling with an optional support member coupled with a support member receiver.

Referring to FIGS. 3, 10 and 15, an elongated support track 20 may be joined to an overlying clamping member 18 to provide additional structural stability to the running board 10, and to further couple the first and second running board components 12 and 14. The optional support track 20 could be employed for heavy-duty loads, or for additional support at frequent stepping locations near doors. Additionally the optional support track 20 could be used on vehicles that have running board support brackets at only the front and rear of the vehicle, as opposed to other vehicles that also feature a middle support bracket. Although traditional nuts, bolts, and screws are depicted, the support track 20 may be engaged with the clamping member 18 in numerous ways, such as by sliding engagement with the clamp member 18, or other suitable attachment means.

Figures 16, 17:
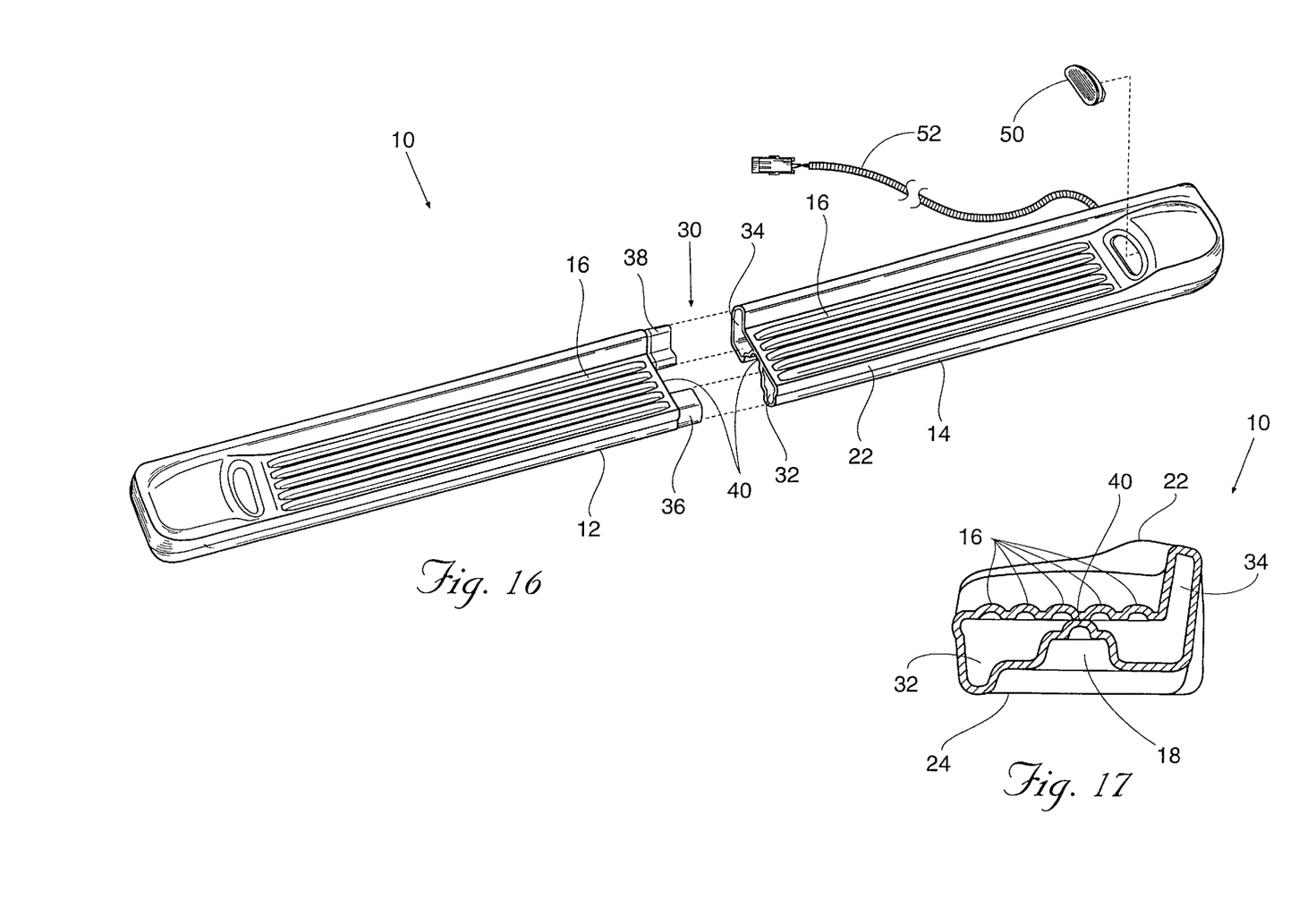
FIG. 16 is a perspective view of the first right side running board showing detachable coupling and a removable light.
FIG. 17 is a cross sectional view of one portion of a running board showing the coupling, a support member receiver, and traction grooves.

As depicted in FIGS. 15–17, the coupling 30 joins together the first and second running board components 12 and 14, and preferably provides a slidably operable male-female engagement designed for optimal weight bearing. If additional coupling strength is required, an additional male-female coupling may be provided, as best shown in cross-section in FIG. 17. The just mentioned male-female coupling 30 comprises first longitudinally extending male members 36. First female coupling members 32 are each arranged to respectively receive the members 36.

An additional coupling support 40 concentrates downward vertical forces across the clamping member 18, adding structural stability in either the presence or absence of the optional support track member 20.

Figure 18:
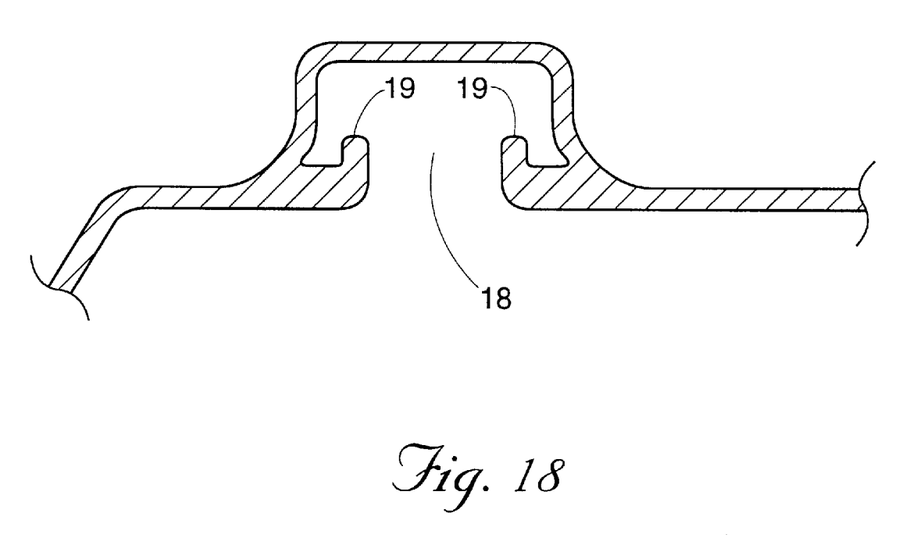
FIG. 18 is a cross sectional view with portions cut away of an alternate embodiment of a support member receiver.

Referring now to FIG. 18, a cross sectional view with portions cut away of an alternate embodiment of a support member receiver or clamping member 18. As FIG. 18 shows, the clamping member 18 can be equipped with flanges 19 to engage and maintain the optional support track member 20. The flanges 19 face upwardly when the running board 10 is installed on a vehicle.

The lamp assembly 50 emits light to indicate at least one of vehicular dome light activation, vehicular braking, vehicular reverse gear engagement, vehicular turn signaling, vehicular emergency signaling, remote keyless entry activation, and vehicular headlight activation. Depending on consumer/manufacturer preference, the lamp assembly 50 may be colored to match traditional vehicular color signals. For instance, white commonly denotes vehicular reverse gear engagement, red commonly denotes headlight activation, and bright red commonly denotes vehicular braking. Of course, any number of lights may be contained within the lamp assembly 50 indicating any number or combination of traditional vehicular signals. Alternatively, the lamp assembly 50 may emit any color light rays to indicate any status of the vehicle. For example, but not by way of limitation, dim white could denote vehicular dome light activation, or blinking light could indicate remote keyless entry activation.

The lamp assembly 50 comprises one or more light bulbs (not shown) fully enclosed within an enclosure 51 having a lens 53. If more than one signal is desired from the lamp assembly 50, more than one light bulb may be used, for example one light behind a red enclosure to indicate braking, in combination with a second light bulb behind a clear or white enclosure to indicate reverse gear engagement. Preferably, the enclosure 51 is constructed of rigid plastic that readily transmits, diffuses, or disseminates light rays, much like common dome lighting enclosures in a vehicle's interior.

The lamp assembly 50 is preferably fully enclosed. This is preferable to exposed assemblies because on traditional running boards with lights, the lights are often exposed on the under-side of running boards to facilitate bulb changes. However, such exposure results in bulb breakage and build up of dirt, tar and other debris common to exposure to environmental conditions. Bulb changes with a fully enclosed lamp assembly 50 can be accomplished by removing components of the lamp assembly 50, as shown in FIG. 15, then changing the bulb.

To supply power to the lamp assembly 50, the lamp assembly 50 may be wired through an electrical connection 52 to the vehicle's power supply system (not shown), originating at either a converter or battery source. Alternatively, the lamp assembly 50 may be wired to a battery independent of the vehicle electrical system, such as a traditional disposable battery located within the running board 10 (not shown). To supply logic to the lamp assembly 50, the lamp assembly 50 would be wired through the electrical connection 52 to the wires that control other vehicle lights (not shown).

The vehicle running board 10 may be formed by any number of traditional manufacturing techniques. However, blow molding and rotational molding techniques are preferable. In the blow molding process, two halves of a pre-formed cast are placed together, and the raw material is placed into the mold. Next, an air injection device similar to a straw is placed into the mold containing the raw material, and air is injected at high pressure in order to force the raw material to the walls of the mold in an evenly distributed manner. The air also aids in curing the raw material. The blow molding results in very uniform wall thickness and fast cycle times. Alternatively, rotational molding can be used to form the running boards. In this process, the melted raw material is placed within the cast, and the cast is rotated at high speeds along all axes in order to spread the material along the cast walls by centrifugation. However, this technique is more expensive, takes a longer time to cure the raw material, and takes more space due to the necessity to rotate.

Both of these processes result in integral construction, wherein the first and second running board components are only one piece, i.e., resulting from a singular mold. This is advantageous to other construction techniques whereby additional components such as traction grooves would have to be added to the base structural components in an additional processing step.

The first and second running board components 12 and 14 can be fabricated from a wide range of raw materials. Several material characteristics are desired, including high formability with minimal shrinkage, endurance, high mechanical strength, resistance to UV degradation, and low expense.

Metals are one suitable material. However, metals may not be amenable to the preferred molding techniques. Accordingly, it is preferable to construct the first and second running board components 12 and 14 with polymers, such as reinforced polyesters. Once such family of reinforced polyesters that perform well are thermoplastic resins. Thermoplastic polyester resins are noted for their excellent flow characteristics in thin wall applications, close molding tolerances, and high productivity from multi-cavity molds.

Several thermoplastic resins have the desired mechanical characteristics, and would perform suitably. Within the family of thermoplastic resins, styrenic compounds in general and acrylonitrile butadiene styrene (ABS) specifically have been found to achieve desirable results. In this three monomer ABS composition, styrene contributes the desired ease of processing characteristic, acrylonitrile adds chemical resistance and flexural strength, and butadiene adds impact and overall material strength. ABS may perform particularly well due to its dimensional stability, toughness at wide naturally occurring temperature variations, and chemical resistance. In the illustrated embodiment, the first and second running board components 12 and 14 are constructed of the preferred thermoplastic resin ABS.

In addition, the ABS material may include additives to raise the flexural modulus and provide improved processing characteristics. The ABS may include a fiber additive, including glass fiber and/or mineral fiber to improve these characteristics.

The disclosed structures also lend themselves to methods of indicating vehicular mobilization status. A method of indicating at least one of vehicular dome light activation, vehicular braking, vehicular reverse gear engagement, vehicular turn signaling, vehicular emergency signaling, remote keyless entry activation, and vehicular headlight activation comprises the steps of: coupling a vehicle running board 10 to a vehicle, providing the vehicle running board with a lamp assembly 50 in electronic communication with a lighting circuitry on the vehicle, the lighting circuitry operable to indicate at least one of vehicular dome light activation, vehicular braking, vehicular reverse gear engagement, vehicular turn signaling, vehicular emergency signaling, remote keyless entry activation, and vehicular headlight activation. The method further comprises the step of activating the lamp assembly 50 in response to the lighting circuitry on the vehicle.

The foregoing is considered as illustrative only of the principles of the invention. Furthermore, because numerous modifications and changes will readily occur to those skilled in the art, it is not desired to limit the invention to the exact construction and operation shown and described. Although the preferred embodiment has been described, the details may be changed without departing from the invention, which is defined by the claims.

What is claimed is:

1. A vehicle running board for attachment to a vehicle, the vehicle running board comprising:
   a first running board component,
   a second running board component,
   a lamp assembly, the lamp assembly being supported by at least one of the first and the second running board components,
   a male-female engagable coupling for joining the first running board component to the second running board component.

2. The vehicle running board of claim 1, wherein the lamp assembly is removably supported by at least one of the first and the second running board components.

3. The vehicle running board of claim 1, wherein the first running board component includes a top side and a bottom side, and the second running board component includes a top side and a bottom side, and wherein the lamp assembly is disposed on the top side of said running board component.

4. The vehicle running board of claim 1, wherein the first running board component includes a top side and a bottom side, and the second running board component having a top side and a bottom side, the running board further comprising:
   a support member receiver disposed along the bottom side of at least one of the first running board component and the second running board component.

5. The vehicle running board of claim 4, wherein the running board further comprises:
   support member coupled with the support member receiver.

6. The vehicle running board of claim 1, wherein each of said running board components includes a top side and a bottom side, the top side of at least one of said running board components including traction grooves.

7. The vehicle running board of claim 6, wherein the traction grooves are integral with its running board component.

8. The vehicle running board of claim 1, wherein the lamp assembly emits light to indicate at least one of vehicular dome light activation, vehicular braking, vehicular reverse gear engagement, vehicular turn signaling, vehicular emergency signaling, remote keyless entry activation, and vehicular headlight activation.

9. The vehicle running board of claim 1, wherein the lamp assembly includes an enclosure and a light bulb fully enclosed within said enclosure.

10. The vehicle running board of claim 1, wherein the lamp assembly is detachably coupled with a power source.

11. The vehicle running board of claim 10, wherein the power source is the vehicle electrical system.

12. The vehicle running board of claim 10, wherein the power source is a battery independent of the vehicle electrical system.

13. The vehicle running board of claim 1, wherein the running board is fabricated from a molding resin.

14. The vehicle running board of claim 13, wherein the running board is formed by at least one of blow molding and rotational molding techniques.

15. The vehicle running board of claim 1, wherein the first running board component and the second running board component are each fabricated from a thermoplastic resin.

16. The vehicle running board of claim 15, wherein the thermoplastic resin is a styrenic compound.

17. The vehicle running board of claim 16, wherein the styrenic compound is acrylonitrile butadiene styrene.

18. The vehicle running board of claim 17, wherein the acrylonitrile butadiene styrene includes a fibrous additive.

19. The vehicle running board of claim 18, wherein the fibrous additive is selected from the group consisting of a glass fiber and a mineral fiber.

* * * * *

UNITED STATES PATENT AND TRADEMARK OFFICE
CERTIFICATE OF CORRECTION

PATENT NO. : 6,382,819 B1
DATED : May 7, 2002
INVENTOR(S) : Timothy P. McQuiston It is certified that error appears in the above-identified patent and that said Letters Patent is hereby corrected as shown below:

Column 6,
Line 43, insert -- a -- before "support".

Signed and Sealed this

Sixth Day of July, 2004

JON W. DUDAS
*Acting Director of the United States Patent and Trademark Office*